(12) United States Patent
Wray et al.

(10) Patent No.: US 7,647,494 B2
(45) Date of Patent: Jan. 12, 2010

(54) NAME TRANSFORMATION FOR A PUBLIC KEY INFRASTRUCTURE (PKI)

(75) Inventors: John C. Wray, Chelmsford, MA (US); David J. Miller, Burlington, MA (US)

(73) Assignee: International Business Machines Corporation, Armonk, NY (US)

( * ) Notice: Subject to any disclaimer, the term of this patent is extended or adjusted under 35 U.S.C. 154(b) by 804 days.

(21) Appl. No.: 11/149,471

(22) Filed: Jun. 8, 2005

(65) Prior Publication Data

US 2006/0282663 A1   Dec. 14, 2006

(51) Int. Cl.
  *H04L 9/32*   (2006.01)
  *H04L 29/06*   (2006.01)
  *G06F 7/00*   (2006.01)
  *H04L 9/00*   (2006.01)
(52) U.S. Cl. .................. 713/158; 713/156; 713/176; 717/117
(58) Field of Classification Search .................. 713/158
  See application file for complete search history.

(56) References Cited

U.S. PATENT DOCUMENTS

| | | | |
|---|---|---|---|
| 5,625,693 | A | 4/1997 | Rohatgi et al. |
| 5,774,552 | A | 6/1998 | Grimmer |
| 6,367,013 | B1 * | 4/2002 | Bisbee et al. ............... 713/176 |
| 6,516,316 | B1 | 2/2003 | Ramasubramani et al. |
| 6,535,978 | B1 | 3/2003 | Padgett et al. |
| 6,738,912 | B2 * | 5/2004 | Buttiker ..................... 713/158 |
| 6,766,450 | B2 | 7/2004 | Micali |
| 6,795,920 | B1 | 9/2004 | Bacha et al. |
| 2002/0059519 | A1 | 5/2002 | Yamagishi et al. |
| 2002/0184182 | A1 | 12/2002 | Kwan |
| 2003/0115457 | A1 | 6/2003 | Wildish et al. |

2006/0265689 A1 * 11/2006 Kuznetsov et al. .......... 717/117

FOREIGN PATENT DOCUMENTS

| EP | 1 117 204 A2 | 7/2001 |
|---|---|---|
| JP | 2002353959 A2 | 12/2002 |
| JP | 2003152715 A2 | 5/2003 |

(Continued)

OTHER PUBLICATIONS

Jason Crampton, Hoon Wei Lim, Kenneth G. Paterson, "What can identity-based cryptography offer to web services?", Nov. 2007, SWS '07: Proceedings of the 2007 ACM workshop on Secure web services, pp. 26-36.*

(Continued)

*Primary Examiner*—Matthew B Smithers
*Assistant Examiner*—Courtney D Fields
(74) *Attorney, Agent, or Firm*—Ayla Lari; Hoffman Warnick LLC

(57) ABSTRACT

Under the present invention, when a request for a certificate is made, a set of (mapping) rules are used to identify an appropriate directory and any other information sources, and to retrieve information for the certificate therefrom. The directory name is then transformed using the set of rules for use in the certificate. Thereafter, a template for the certificate is developed using the set of rules. The template and the request are then communicated to the PKI, which will generate and return the certificate. Upon receipt, the present invention can verify that the certificate actually includes the transformed name.

23 Claims, 3 Drawing Sheets

FOREIGN PATENT DOCUMENTS

| | | |
|---|---|---|
| JP | 2003244133 A2 | 8/2003 |
| JP | 2003258786 A2 | 9/2003 |
| JP | 2004159159 A2 | 6/2004 |
| WO | WO 2004038528 A2 * | 5/2004 |

OTHER PUBLICATIONS

IBM Technical Disclosure Bulletin, vol. 32, No. 10B, Mar. 1990, pp. 278-280.

Hesse et al., "Managing Interoperability in Non-Hierarchical Public Key Infrastructures".

Chadwick et al., "The PERMIS X.509 Role Based Privilege Management Infrastructure", SACMAT 2002, pp. 135-140.

Park et al., "Role-Based Access Control on the Web", ACM Transactions on Information and System Security, vol. 4, No. 1, Feb. 2001, pp. 37-71.

Zhou et al., "Implement Role Based Access Control with Attribute Certificates", In Proceedings of the 6$^{th}$ International Conference on Advanced Communication Technology (ICACT2004), Feb. 2004, Korea, vol. 1, pp. 536-541.

Chadwick et al., "Policy Based Electronic Transmission of Prescriptions", Proceedings of the 4$^{th}$ International Workshop on Policies for Distributed Systems and Networks (Policy'03).

* cited by examiner

NAME TRANSFORMATION FOR A PUBLIC KEY INFRASTRUCTURE (PKI)

BACKGROUND OF THE INVENTION

1. Field of the Invention

The present invention generally relates to name transformation for a Public Key Infrastructure (PKI). Specifically, the present invention provides a way to transform a directory name or the like into a name suitable for a PKI certificate.

2. Related Art

A Public Key Infrastructure (PKI) enables users of a basically unsecured public network such as the Internet to securely and privately exchange data through the use of a public and a private cryptographic key pair that is obtained and shared through a trusted authority. The PKI provides for a digital "certificate" that can identify an individual or an organization and directory services that can store and, when necessary, revoke the certificates.

The PKI assumes the use of public key cryptography, which is the most common method on the Internet for authenticating a message sender or encrypting a message. Traditional cryptography has usually involved the creation and sharing of a secret key for the encryption and decryption of messages. This secret key system has the significant flaw that if the key is discovered or intercepted by someone else, messages can easily be decrypted. For this reason, public key cryptography and the PKI is the preferred approach on the Internet. (The secret key system is sometimes known as symmetric cryptography and the public key system as asymmetric cryptography). In general, a PKI includes: (1) a certificate authority (CA) that issues and verifies digital certificate. A certificate generally includes the public key or information about the public key; (2) a registration authority (RA) that acts as the verifier for the certificate authority before a digital certificate is issued to a requestor; (3) one or more directories where the certificates (with their public keys) are stored; and (4) a certificate management system. The precise workings of how public and private key cryptography are well known to those of ordinary skill in the art and will not be restated herein.

As useful as PKI technology is, it is not without its drawbacks. For example, within an organization, individuals' contact information is frequently stored in a directory (e.g., an Lightweight Directory Access Protocol (LDAP) directory). Public key certificates are often stored in the same directory, in support of applications such as secure email. However, the directory names associated with individuals are often not well suited for use in certificates since directory names tend to be locally significant, often including intra-organizational information such as department, employee serial number, etc. As such, this information is often not suitable for externally-visible names. In addition, the use of X.509 certificates imposes additional restrictions on the contents of names that appear in certificates (e.g., they must be valid X.500 names, and for maximum interoperability should contain only well-known common naming attributes). Therefore, a user's directory name is often not suitable for use as a name that would appear in the user's certificate.

Verisign has a mechanism to address this problem in their CA that requires that names be broken-down into their component parts by the requestor, and sent to the Verisign CA. Upon receipt, the Verisign CA re-assembles them in an appropriate order to form a (CA-chosen) name. Unfortunately, this mechanism does not support the use of industry-standard certificate request structures (e.g. PKCS#10 and/or PKIX Certificate Template) for specifying the name, and is not suitable for sites that wish to use CAs from multiple vendors. Most other CAs require that the requester construct an appropriate PKI name prior to submitting a request.

In view of the foregoing, there exists a need for a system that is capable of providing a name for a PKI certificate that complies with any rules and/or restrictions. Specifically a need exists for a system that can transform a name of a directory or the like for a certificate requestor into a compliant name that can be used in the certificate.

SUMMARY OF THE INVENTION

In general, the present invention provides a method, system and program product for transforming a name for a PKI. Specifically, the present invention transforms a name of a directory or the like corresponding to a (PKI) certificate requester into a name that complies with any restrictions thereof. Under the present invention, when a request for a certificate is made, a set of (mapping) rules are used to identify an appropriate directory and any other information sources, and to retrieve information for the certificate therefrom. The directory name is then transformed using the set of rules for use in the certificate. Thereafter, a template for the certificate is developed using the set of rules. The template and the request are then communicated to the PKI, which will generate and return the certificate. Upon receipt, the present invention can verify that the certificate actually includes the transformed name.

A first aspect of the present invention provides a method for transforming a name for a public key infrastructure (PKI), comprising: receiving information from a directory using a set of rules pursuant to a request for a certificate; transforming a directory name for use in the certificate using the set of rules; and providing a template for the certificate using the set of rules, wherein the template indicates how to include the transformed name in the certificate.

A second aspect of the present invention provides a system for transforming a name for a public key infrastructure (PKI), comprising: a system for receiving information from a directory using a set of rules pursuant to a request for a certificate; a system for transforming a directory name for use in the certificate using the set of rules; and a system for providing a template for the certificate using the set of rules, wherein the template indicates how to include the transformed name in the certificate.

A third aspect of the present invention provides a program product stored on a computer useable medium for transforming a name for a public key infrastructure (PKI), the computer useable medium comprising program code for performing the following functions: receive information from a directory using a set of rules pursuant to a request for a certificate; transform a directory name for use in the certificate using the set of rules; and provide a template for the certificate using the set of rules, wherein the template indicates how to include the transformed name in the certificate.

A fourth aspect of the present invention provides a method for deploying an application for transforming a name for a public key infrastructure (PKI), comprising: providing a computer infrastructure being operable to: receive information from a directory using a set of rules pursuant to a request for a certificate; transform a directory name for use in the certificate using the set of rules; and provide a template for the certificate using the set of rules, wherein the template indicates how to include the transformed name in the certificate.

A fifth aspect of the present invention provides computer software embodied in a propagated signal for transforming a name for a public key infrastructure (PKI), the computer software comprising instructions for causing a computer system to perform the following functions: receive information from a directory using a set of rules pursuant to a request for a certificate; transform a directory name for use in the certificate using the set of rules; and provide a template for the certificate using the set of rules, wherein the template indicates how to include the transformed name in the certificate.

Therefore, the present invention provides a method, system and program product for transforming a name for a PKI.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, the present invention provides a method, system and program product for transforming a name for a PKI. Specifically, the present invention transforms a name of a directory or the like corresponding to a (PKI) certificate requester into a name that complies with any restrictions therefor. Under the present invention, when a request for a certificate is made, a set of (mapping) rules are used to identify an appropriate directory and any other information sources, and to retrieve information for the certificate therefrom. The directory name is then transformed using the set of rules for use in the certificate. Thereafter, a template for the certificate is developed using the set of rules. The template and the request are then communicated to the PKI, which will generate and return the certificate. Upon receipt, the present invention can verify that the certificate actually includes the transformed name.

To support certificate requests, the user's desired certificate name (and other personally-identifiable information that will appear in the user's certificate) can be automatically derived from information about the user available within the organization. The present invention provides a configurable mapping process that derives the certificate information from directory information, and which could be extended to include additional information from other sources. The process of the present invention is sufficiently general to support the generation of certificate-friendly names that can be used across different CAs, and for which the rules used to construct such names may be expressed as a simple Extensible Markup Language (XML) fragment (or other equivalent data representation) that can be distributed to client systems that create certificate requests. By maintaining the XML fragment on a central server, central management of the name-mapping process is permitted, while the mapping is actually performed on client machines. To this extent, as will be further described below, the present invention can be carried out on client devices or on a server.

Figure 1:
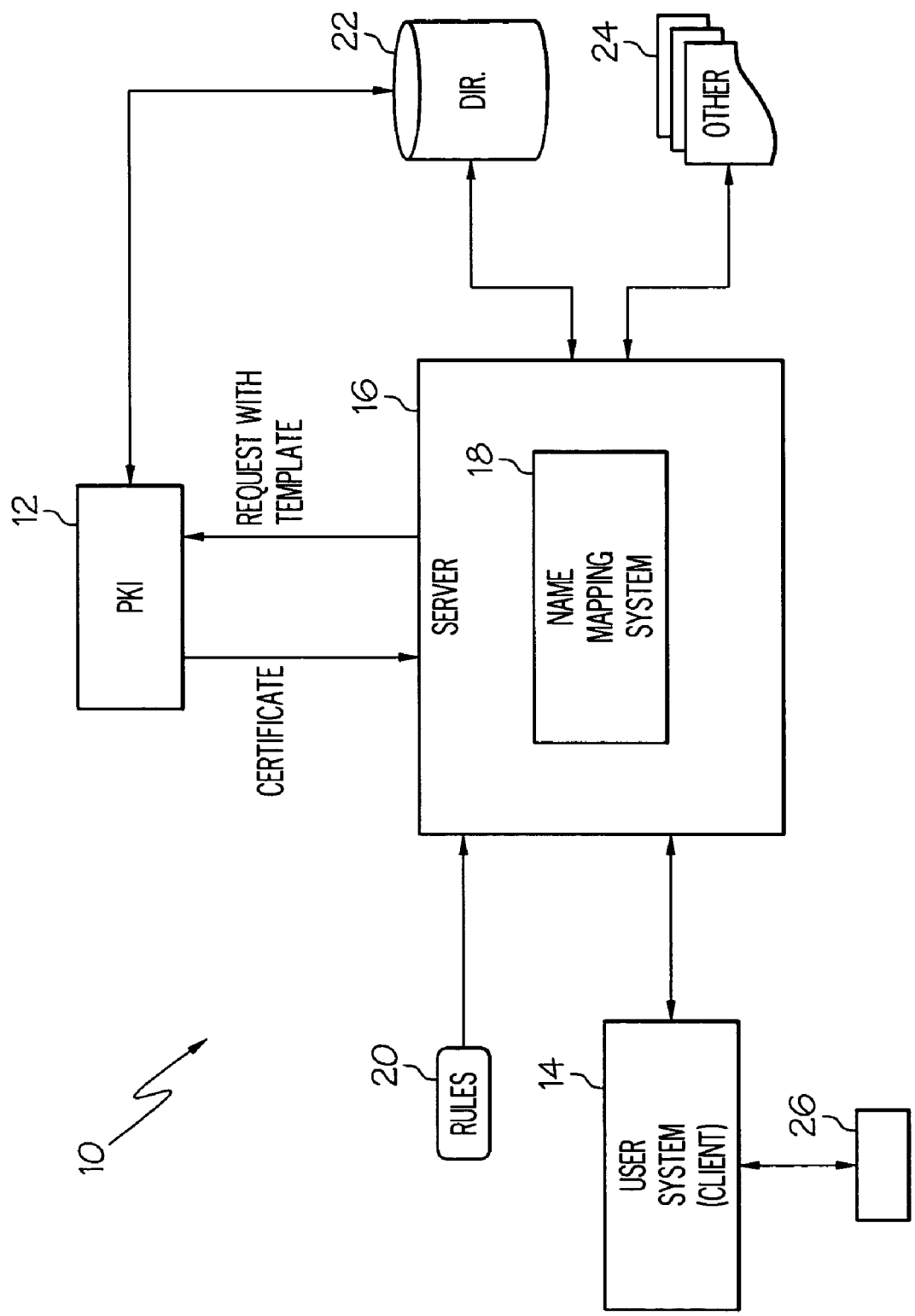
FIG. 1 shows an illustrative system for transforming a name for a PKI according to the present invention.

Referring now to FIG. 1, a system 10 for transforming a name for a PKI 12 according to the present invention is shown. As shown, system 10 depicts user system 14 (e.g., a client device) in communication with a server 16, which itself is in communication with PKI 12. In a typical embodiment, system 10 is implemented in a network environment (e.g., the Internet, a wide area network (WAN), a local area network (LAN), a virtual private network (VPN), etc. Communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

Regardless, assume in an illustrative example that requestor 26 is requesting a digital certificate from PKI 12 to send secure email or the like. As indicated above, such certificates typically include information for requestor 26 from directory 22 (e.g., an LDAP directory) such as a name of directory 22. As further indicated above, however, such names are often not suitable for inclusion in the certificate due to various naming rules, the localized nature of such names, etc. This is a problem that no previous system has addressed. Under the present invention, name mapping system 18 is provided that allows, among other things, for a name of directory 22 to be transformed into a compliant name for inclusion in the certificate by PKI 12.

When requestor 26 requests a certificate on user system 14 (e.g., using a program that is capable of requesting certificates), that request will be communicated to server 16. Pursuant to the request, name mapping system 18 will utilize a set (e.g., one or more) of rules 20 that not only identify directory 22 and any other information sources 24 from which information for the certificate can be retrieved, but also specify how to transform the name of directory 22 into a compliant name that can be used in the certificate. The set of rules 20 can also set forth details for providing a template for the certificate that can be used by PKI 12. For example, the template can specify how (e.g., where) to include the transformed name in the certificate. The template, along with the request can then be communicated to PKI 12, which will generate and return the certificate to server 16. Upon receipt, name mapping system 18 can further verify that the certificate does indeed include the transformed name.

It should be understood that although name mapping system 18 is shown loaded on server 16, this need not be the case. Rather, name mapping system 18 could be implemented on user system 14. In such a case, set of rules 20 could be defined on server 16 and transferred to user system 14 where the present invention is implemented. Also, in such a case, the functions of the present invention (e.g., information retrieval, name transformation, etc.) could be performed as the request for the certificate is being constructed. To this extent, name mapping system 18 could be implemented with, or work in conjunction with, any program now known or later developed that is capable of generating requests for certificates.

Figure 2:
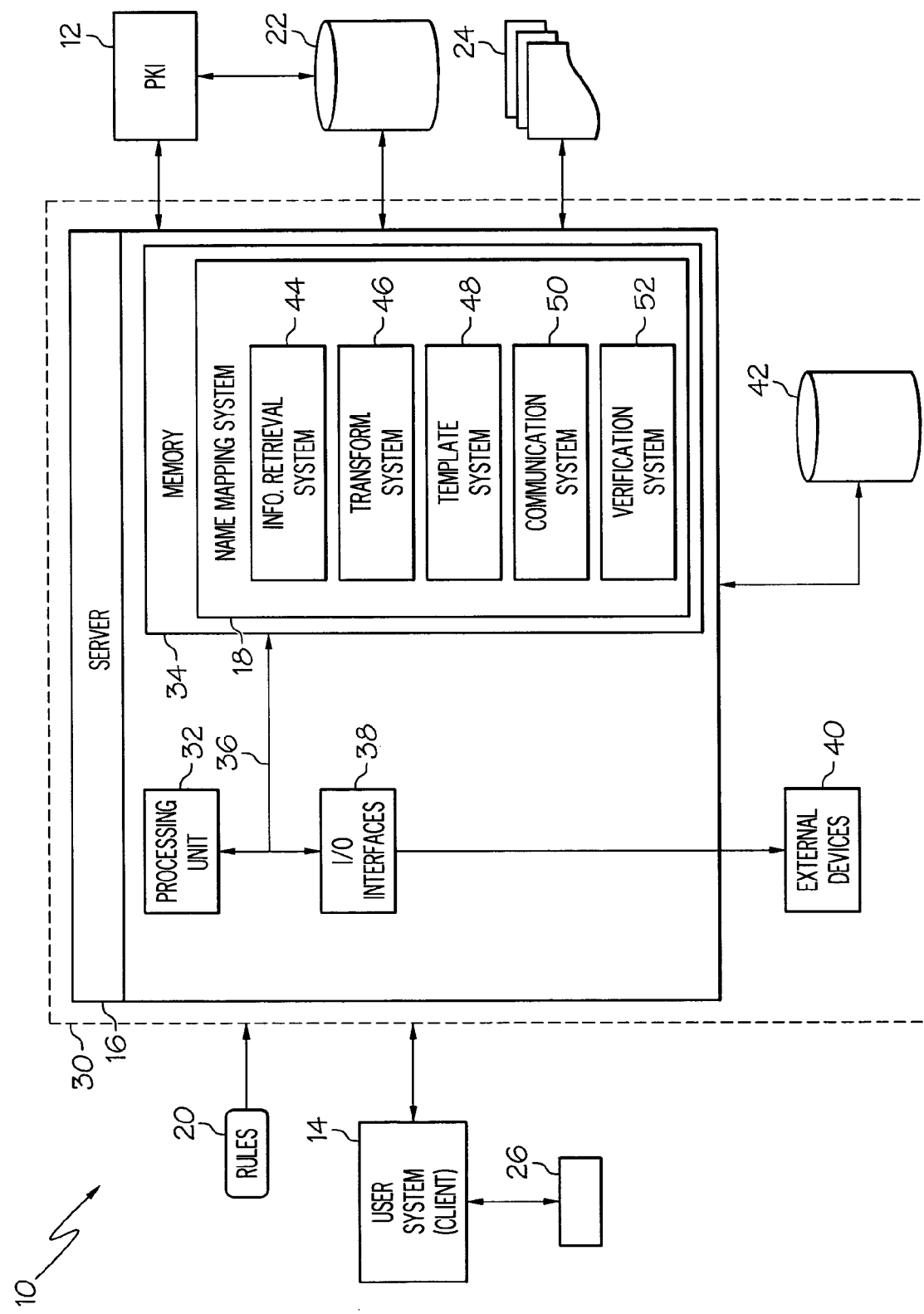
FIG. 2 shows a more detailed diagram of the system of FIG. 1 according to the present invention.

Referring now to FIG. 2, system 10 is shown in greater detail. As shown, FIG. 2 depicts server 16 deployed within a computer infrastructure 30. This is intended to demonstrate that some or all of the components of system 10 could be deployed, managed, serviced, etc. by a service provider who offers to perform the functions of the present invention for customers. In any event, server 16 is shown including a processing unit 32, a memory 34, a bus 36, and an input/output (I/O) interfaces 38. Further, server 16 is shown in communication with external I/O devices/resources 40 and storage system 42. In general, processing unit 32 executes computer program code, such as name mapping system 18, which is stored in memory 34 (as shown) and/or storage system 42. While executing computer program code, processing unit 32 can read and/or write data, to/from memory 34, storage system 42, and/or I/O interfaces 38. Bus 36 provides a communication link between each of the components in server 16. External devices 40 can comprise any devices (e.g., keyboard, pointing device, display, etc.) that enable a user to interact with server 16 and/or any devices (e.g., network card, modem, etc.) that enable server 16 to communicate with one or more other computing devices.

Computer infrastructure 30 is only illustrative of various types of computer infrastructures for implementing the invention. For example, in one embodiment, computer infrastructure 30 comprises two or more computing devices (e.g., a server cluster) that communicate over a network to perform the various process steps of the invention. Moreover, server 16 is only representative of various possible computer systems that can include numerous combinations of hardware. To this extent, in other embodiments, server 16 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 32 may comprise a single processing unit, or be distributed across one or more processing units in one or more locations, e.g., on a client and server.

Similarly, memory 34 can comprise any combination of various types of data storage and/or transmission media that reside at one or more physical locations. Further, I/O interfaces 38 can comprise any system for exchanging information with one or more external devices 40. Still further, it is understood that one or more additional components (e.g., system software, math co-processing unit, etc.) not shown in FIG. 2 can be included in server 16. However, if server 16 comprises a handheld device or the like, it is understood that one or more external devices 40 (e.g., a display) could be contained within server 16, not externally as shown.

As shown, server 16 communicates with storage system 42, which can be any type of system (e.g., a database) capable of providing storage for information under the present invention such as set of rules 20, information retrieved from directory 22 and/or other information sources 24, certificates received from PKI, 12 etc. To this extent, storage system 42 could include one or more storage devices, such as a magnetic disk drive or an optical disk drive. In another embodiment, storage system 42 could include data distributed across, for example, a local area network (LAN), wide area network (WAN) or a storage area network (SAN) (not shown). In addition, although not shown, additional components, such as cache memory, communication systems, system software, etc., may be incorporated into server 16.

Shown in memory 34 of server 16 is name mapping system 18, which includes information retrieval system 44, transformation system 46, template system 48, communication system 50 and verification system 52. As indicated above, the name mapping process of the present invention utilize the inputs of requester 26's directory 22 name, and set of rules 20 to use to produce the transformed name (and other information). As further indicated, the mapping process may operate either locally on user system 14 where the request for the certificate is being constructed, or on server 16. If name mapping system 18 was implemented on user system 14 (as opposed to server 16 as shown), set of rules 20 could be obtained by user system 14 from server 16, or could be distributed to user system 14 from another source. Set of rules 20 are generally defined by the system administrator, based on knowledge of the schema used by the organizational directory 22 and other information sources 24, and on the requirements for externally-visible names. The name mapping system 18 will retrieve information from directory 22 (and potentially other information sources 24) according to set of rules 22, and then transform the name of directory 22 using set of rules 20 to derive an appropriate, externally-meaningful name and other certificate data. The transformed name and other data are then submitted to PKI 12 as part of the requester 26's certificate request, and will appear in the requester 26's certificate.

This process will now be explained in greater detail with respect to the specific sub-systems shown in name mapping system 18. Specifically, when a request for a certificate is received from user system 14, information retrieval system 44 will first identify directory 22 and any other information sources 24 using set of rules 20. In one embodiment, set of rules 20 are specified as an XML fragment(s) or other equivalent data representation) containing: (1) replacement rules that detail how individual name fragments are to be transformed; (2) the identity of directory 22 and any other information sources 24; and (3) a template (or at least details and/or a framework for providing the template) for generating the requested certificate. When directory 22 and any other information sources 24 are identified, information retrieval system 44 will retrieve any needed information therefrom. Such information can include any type of information related to requestor 26 such as a user names, a password, an email address, etc.

In any event, using set of rules 46, transformation system 46 will transform a name of directory 22 (i.e., directory name or name in the directory) into a certificate suitable name. For example, a "replacement" rule in set of rules 20 may specify that the directory name fragment "uid=?/cn=users" should be replaced with the PKI name fragment "cn=?". The question mark implies parameter substitution, thus a directory name fragment "uid=Fred Smith/cn=users" would be replaced with the PKI name fragment "cn=fred Smith". Set of rules 20 may also permit re-ordering of name components—a replacement rule that specifies that "o=?1/ou=?2" be replaced by "ou=?2/o=?1" would re-order "o" and "ou" components of a name to be more in-keeping with their conventional order. If replacement rules are repetitively applied, complex re-ordering or sorting of name components is possible. Replacement rules may cause directory name fragments to be omitted from the PKI name, either as in the previous "uid=?/cn=users"->"cn=?" example which removes the "cn=users" name component while mapping the adjacent "uid" component to a "cn" component, or by explicit removal rules that cause a given name component to be replaced by an empty string.

As indicated above, set of rules 20 can also identify other information sources 24. Such other information sources 24 may be specified within the same XML fragment. For example, in one embodiment of the invention, an XML clause can specify that the named user's email address should be included in the directory name as transformed. A qualifier on this clause specifies whether the email address should be added to the PKI name being constructed as a name component (after which it may be re-ordered or otherwise modified by replacement rules), or whether it should be added to the certificate request as an alternative subject name.

In any event, after the directory name has been transformed as dictated by set of rules 20, template system 48 will provide a template for PKI 12 to generate the requested certificate. The template should at least indicate how the transformed name should be used/appear in the certificate. For example, the template could dictate the location in which the transformed name should appear. It should be understood that template system 48 could itself generate the template based details or the like contained in set of rules 20, or it could retrieve a template from storage system 42 or some other location that is identified in set of rules 20. In any event, once the template is provided, it will be communicated with the request to PKI 12 by communication system 50, which will generate the requested certificate according to the template and send the same back to server 12 (e.g., for receipt by communication system 50). Also, the certificate could be stored in directory 22 and/or storage system 42.

Once the certificate is received, verification system 52 can verify that the certificate does indeed include the transformed name. This can be accomplished by referencing the transformed name (e.g., as maintained on server 16) and comparing the same to the name used in the certificate. Alternatively, verification system 52 could use set of rules 20 to transform the name anew and compare the same to the name used in the certificate. The latter approach would provide a double check to ensure that the transformed name appears in the certificate as well as to ensure that transformation system 46 originally transformed the name of directory 22 correctly.

Figure 3:
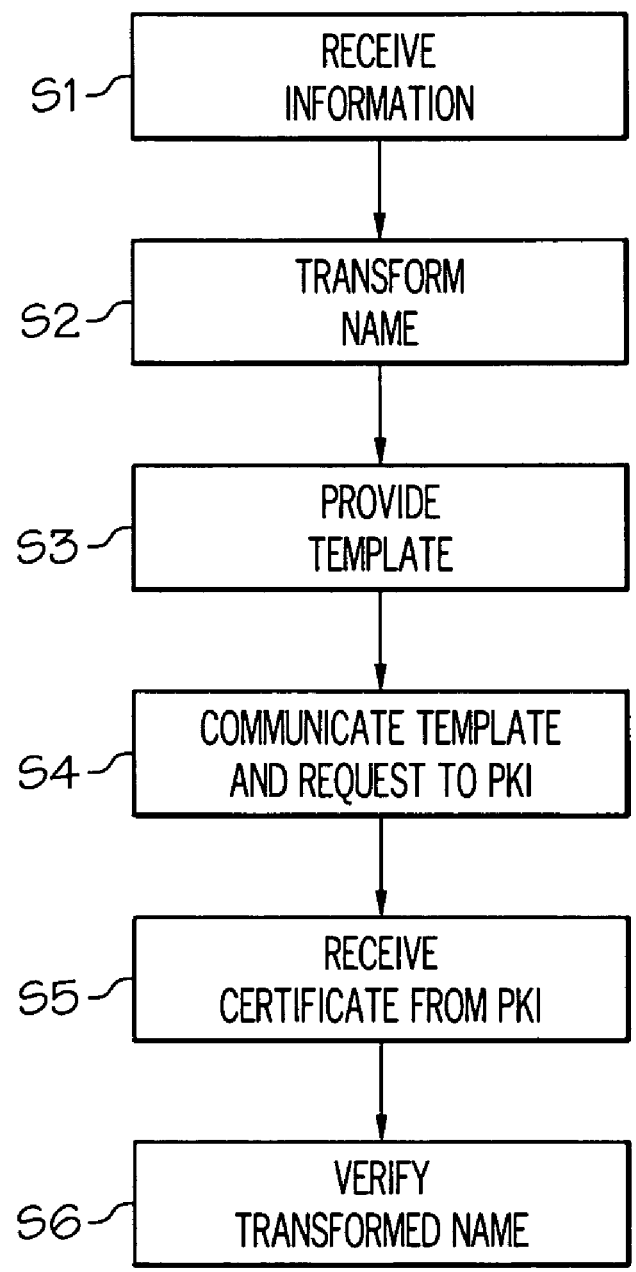
FIG. 3 an illustrative method flow diagram according to the present invention.

Referring now to FIG. 3, a method flow diagram 100 according to the present invention is shown. As depicted, first step S1 is to receive information from a directory using a set of rules pursuant to a request for a certificate. Second step S2 is to transform a directory name for use in the certificate using the set of rules; Third step S3 is to provide a template for the certificate using the set of rules. As mentioned above, the template indicates how to include the transformed name in the certificate. Fourth step S4 is to communicate the template and the request to the PKI. Fifth step S5 is to receive the certificate from the PKI. Sixth step S6 is to verify that the certificate includes the transformed name.

While shown and described herein as a method and system for transforming a name for a PKI, it is understood that the invention further provides various alternative embodiments. For example, in one embodiment, the invention provides a computer-readable medium that includes computer program code to enable a computer infrastructure to transform a name for a PKI. To this extent, the computer-readable medium includes program code that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 34 (FIG. 2) and/or storage system 42 (FIG. 2) (e.g., a fixed disk, a read-only memory, a random access memory, a cache memory, etc.).

In another embodiment, the invention provides a business method that performs the process steps of the invention on a subscription, advertising, and/or fee basis. That is, a service provider, such as a Solution Integrator, could offer to transform a name for a PKI. In this case, the service provider can create, maintain, support, etc., a computer infrastructure, such as computer infrastructure 30 (FIG. 2) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a method for transforming a name for a PKI. In this case, a computer infrastructure, such as computer infrastructure 30 (FIG. 2), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as server 16 (FIGS. 1 and 2), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for transforming a name for a public key infrastructure (PKI), comprising:
    receiving information from a directory using a set of rules pursuant to a request for a certificate;
    transforming a directory name for use in the certificate using the set of rules; and
    providing a template for the certificate using the set of rules, wherein the template indicates how to include the transformed name in the certificate.

2. The method of claim 1, further comprising:
    communicating the template and the request to the PKI;
    receiving the certificate from the PKI; and
    verifying that the certificate includes the transformed name.

3. The method of claim 1, wherein the set of rules sets forth an algorithm for transforming the directory name.

4. The method of claim 3, wherein the set of rules further identify any other information sources from which additional information can be retrieved, wherein the receiving step further comprises receiving the additional information from the other information sources.

5. The method of claim 4, wherein the additional information comprises an electronic mail address, and wherein the directory name as transformed includes the electronic mail address.

6. The method of claim 1, wherein the method is implemented on a server.

7. The method of claim 1, wherein the set of rules are defined on the server, and wherein the set of rules are transferred from the server to a client where the method is implemented.

8. The method of claim 1, wherein the certificate is a public key certificate.

9. A system for transforming a name for a public key infrastructure (PKI), comprising:
at least one computing device
a computing device-implemented system for receiving information from a directory using a set of rules pursuant to a request for a certificate;
a computing device-implemented system for transforming a directory name for use in the certificate using the set of rules; and
a computing device-implemented system for providing a template for the certificate using the set of rules, wherein the template indicates how to include the transformed name in the certificate.

10. The system of claim 9, further comprising a system for verifying that the certificate as received from the PKI includes the transformed name.

11. The system of claim 9, wherein the set of rules sets forth an algorithm for transforming the directory name.

12. The system of claim 11, wherein the set of rules further identify any other information sources from which additional information can be retrieved, wherein the system for receiving further receives the additional information the other information sources.

13. The system of claim 9, wherein the system is implemented on a server.

14. The system of claim 9, wherein the system is implemented on a client.

15. The system of claim 9, wherein the certificate is a public key certificate.

16. A program product stored on a computer useable medium for transforming a name for a public key infrastructure (PKI), the computer useable medium comprising program code for performing the following functions:
receive information from a directory using a set of rules pursuant to a request for a certificate;
transform a directory name for use in the certificate using the set of rules; and
provide a template for the certificate using the set of rules, wherein the template indicates how to include the transformed name in the certificate.

17. The program product of claim 16, wherein the computer useable medium further comprises program code for performing the following functions:
communicate the template and the request to the PKI;
receive the certificate from the PKI; and
verify that the certificate includes the transformed name.

18. The program product of claim 16, wherein the set of rules sets forth an algorithm for transforming the directory name.

19. The program product of claim 18, wherein the set of rules further identify any other information sources from which additional information can be retrieved, wherein the computer useable medium further comprises program code for performing the following function: receive the additional information from the other information sources.

20. The program product of claim 16, wherein the program product is implemented on a server.

21. The program product of claim 16, wherein the program product is implemented on a client.

22. A method for deploying an application for transforming a name for a public key infrastructure (PKI), comprising:
providing a computer infrastructure being operable to:
receive information from a directory using a set of rules pursuant to a request for a certificate;
transform a directory name for use in the certificate using the set of rules; and
provide a template for the certificate using the set of rules, wherein the template indicates how to include the transformed name in the certificate.

23. The method of claim 22, wherein the computer infrastructure is further operable to verify that the certificate as received from the PKI includes the transformed name.

* * * * *

UNITED STATES PATENT AND TRADEMARK OFFICE
CERTIFICATE OF CORRECTION

PATENT NO. : 7,647,494 B2 Page 1 of 1
APPLICATION NO. : 11/149471
DATED : January 12, 2010
INVENTOR(S) : Wray et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1253 days.

Signed and Sealed this

Sixteenth Day of November, 2010

David J. Kappos
*Director of the United States Patent and Trademark Office*